(12) United States Patent
Granby et al.

(10) Patent No.: US 10,104,240 B2
(45) Date of Patent: Oct. 16, 2018

(54) METHODS AND SYSTEMS FOR MANAGING AUTHENTICATION DEVICES COUPLED TO MULTI-FUNCTION DEVICES

(71) Applicant: XEROX CORPORATION, Norwalk, CT (US)

(72) Inventors: Peter Granby, Stevenage (GB); Rajana Mukesh Panchani, London (GB)

(73) Assignee: XEROX CORPORATION, Norwlak, CT (US)

( * ) Notice: Subject to any disclaimer, the term of this patent is extended or adjusted under 35 U.S.C. 154(b) by 0 days.

(21) Appl. No.: 15/447,828

(22) Filed: Mar. 2, 2017

(65) Prior Publication Data

US 2018/0255189 A1 Sep. 6, 2018

(51) Int. Cl.
*G06K 15/00* (2006.01)
*H04N 1/00* (2006.01)
*H04N 1/44* (2006.01)

(52) U.S. Cl.
CPC ..... *H04N 1/00079* (2013.01); *H04N 1/00007* (2013.01); *H04N 1/00037* (2013.01); *H04N 1/00832* (2013.01); *H04N 1/442* (2013.01); *H04N 1/4426* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| 7,520,437 | B2 | 4/2009 | Daniel et al. | |
|---|---|---|---|---|
| 8,559,033 | B2 | 10/2013 | Kohli et al. | |
| 8,832,340 | B2 | 9/2014 | Miyachi et al. | |
| 2005/0076281 | A1* | 4/2005 | Kojima | G06F 11/0733 714/736 |
| 2006/0226950 | A1* | 10/2006 | Kanou | G06F 21/10 340/5.61 |
| 2008/0144105 | A1* | 6/2008 | Yagi | H04N 1/00347 358/1.16 |
| 2008/0147900 | A1* | 6/2008 | Iizuka | G03G 15/5075 710/8 |
| 2009/0307764 | A1* | 12/2009 | Isobe | G06F 21/32 726/7 |

(Continued)

*Primary Examiner* — Moustapha Diaby (57) ABSTRACT

The disclosure discloses methods and systems for managing an authentication device such as a card reader coupled to a multi-function device. The multi-function device includes a memory for storing information related to one or more users, one or more pre-authorized users and alert setting instructions. The multi-function device includes an authentication device, coupled to a universal serial bus peripheral port of the device, and configured for: receiving authentication information from a user via an input method. The multi-function device further includes a control system configured for authenticating the user to access the multi-function device for one or more functions, based on the authentication information. The control system is further configured for generating an alert for the one or more pre-authorized users when the authentication device is disconnected or is malfunctioned, and for transmitting the alert to the one or more pre-authorized users, for one or more pre-defined actions.

28 Claims, 8 Drawing Sheets

(56) References Cited

U.S. PATENT DOCUMENTS

| | | | |
|---|---|---|---|
| 2010/0332691 A1* | 12/2010 | Yoshida | G06F 13/4081 |
| | | | 710/16 |
| 2011/0055854 A1* | 3/2011 | Kawai | G06F 8/61 |
| | | | 719/327 |
| 2011/0075179 A1* | 3/2011 | Utsumi | G06F 21/31 |
| | | | 358/1.13 |

* cited by examiner

Card Reader Disconnection Alerts

Alert Enablement — 402
- ● Enabled
- ○ Disabled

---

Alert Options — 404
- ● Email
- ○ SMS Text
- ○ Audit Log Entry

[Confirm] [Cancel]

METHODS AND SYSTEMS FOR MANAGING AUTHENTICATION DEVICES COUPLED TO MULTI-FUNCTION DEVICES

TECHNICAL FIELD

The present disclosure generally relates to the field of multi-function devices, more particularly, the disclosure discloses methods and systems for managing authentication devices coupled to multi-function devices.

BACKGROUND

Enterprises generally rely on multiple devices for performing various functional tasks. For example, the enterprises rely on a printer for taking out prints, on a facsimile machine for sending and receiving faxes, on a scanner for scanning documents, and on a photocopy machine for creating copies of documents. However, with the growth of technology, such various tasks can be performed using a single device, known as a multi-function device (MFD). MFDs are beneficial for enterprises as these devices utilize less saving workspace, have less hardware costs as well as offer enhanced performance along with efficiency.

Generally enterprises implement authentication before providing access to such multi-function devices and thus, provide restricted access to these devices or their services. For example, a user A may have access to printing, and scanning, while a user B may have access to all functionalities of a multi-function device such as printing, scanning, copying, faxing or the like. To this end, the multi-function devices are coupled to authentication devices for authenticating users before giving access to multi-function devices. The authentication devices further help track the usage of the multi-function devices. Examples of authentication devices include card readers, keypads, fingerprint scanners, or the like.

Many a times, the authentication devices are disconnected accidentally or maliciously and thus, it becomes issues for environments where there is a need to track the usage of such devices. Moreover, the disconnection may be viewed as vulnerability in accounts where security is deemed a high priority. Currently, the multi-function devices offer alert messages for low toner, however, there is no bi-directional messaging related to connection or disconnection for the authentication devices, for example, card readers. Therefore, there is a need for methods and systems for managing authentication devices coupled to multi-function devices.

SUMMARY

According to aspects illustrated herein, embodiments of the disclosure disclose a multi-function device configured for managing an authentication device coupled to the multi-function device. The multi-function device includes a memory for storing information related to: one or more users, one or more pre-authorized users and alert setting instructions. The multi-function device includes the authentication device coupled to a universal serial bus (USB) peripheral port of the multi-function device. The authentication device is configured for receiving an authentication information from a user via an input method. The multi-function device includes a control system configured for: authenticating the user to access the multi-function device for one or more functions, based on the authentication information of the user; checking whether the authentication device is disconnected from the multi-function device or is malfunctioned; generating an alert for the one or more pre-authorized users when the authentication device is disconnected from the multi-function device or malfunctioned; and transmitting the alert to the one or more pre-authorized users, for one or more pre-defined actions.

According to further embodiments illustrated herein, a multi-function device for generating alerts related to card readers is disclosed. The multi-function device includes a memory for storing information related to: one or more users, one or more pre-authorized users and alert setting instructions. The multi-function device includes a card reader including a slot for receiving a smart card containing authentication information specific to a user. The multi-function device includes a control system configured for: detecting the smart card as input by the user within the slot; authenticating the user to access the multi-function device for one or more functions, based on the information stored in the smart card; generating an alert with a pre-defined message, for the one or more pre-authorized users when the card reader is disconnected or malfunctioned; and sending the alert to the one or more pre-authorized users, for one or more pre-defined actions.

According to additional embodiments illustrated therein, a method for generating an alert related to an authentication device coupled to a multi-function device, is disclosed. The method includes storing information related to one or more users, one or more admin users and alert setting information. An authentication information is received from a user via an input method. Then, it is detected whether the authentication device is disconnected from the multi-function device or malfunctioned. An alert is generated for the one or more admin users when the authentication device is disconnected from the multi-function device or malfunctioned. The alert is transmitted to the one or more admin users for one or more pre-defined actions.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows

Definitions

In disclosure herein after, one or more terms are used to describe various aspects of the present subject matter. For better understanding of the subject matter, a few definitions are provided herein for better understating of the present disclosure.

The term "multi-function device" refers to a device or a combination of multiple devices configured to perform one or more functions, but not limited to, scanning, printing, copying, imaging, and so forth. The multi-function device includes software, hardware, firmware, or combination thereof. The multi-function device may be a printer, fax machine, scanner, and a copier/photocopy machine. In the context of the current disclosure, the multi-function device is configured for generating one or more alerts related to an authentication device such as a card reader, without limitation.

The term "authentication device" includes all kinds of authentication devices that are known or developed later, for authenticating users for accessing the multi-function device or its services/functions such as printing, scanning copying or the like. Few notable authentication devices include card readers, biometric readers, proximity readers, keypads or the like.

The term "smart card" refers to a memory chip, micro-SD card or similar component which can be received and/or read by the authentication device, for example, card readers. The smart card stores information related to a user such as a profile, an authentication information such as user name/user id, payment information or a combination thereof. The smart card is typically used for specific type of authentication device such as a card reader.

The term "input method" refers to a way of providing input to access the multi-function device. The input is based on the type of authentication device coupled to the multi-function device. For example, if the authentication device is a card reader, the input method for authentication is a smart card. In another example, if the authentication device is a keypad, the input method for authentication is a PIN. While if the authentication device is a biometric reader, then the input method is a fingerprint.

The term "alert" includes any notification or message indicating disconnection or malfunctioning of the authentication device. The alert may be in the form of an email, a text message, an entry in an audit log, or a combination thereof.

The term "users" include all end users which typically use/access the multi-function device for various purposes such as scanning, copying, printing, faxing, or a combination thereof. The term users may interchangbly be used with "end users," or "customers."

The term "pre-authorized users" refer to users who are authorized to receive alerts, change alert setting, set alert instructions or related. Other than this, the pre-authorized users can check, configure, or even repair the multi-function device. The pre-authorized users may be admin users, or anyone who is a part of an organization such as IT team, owner, or the like. The pre-authorized users may interchangbly be used with "admin users," "system administrators," or "key operators."

Overview

Multi-function devices are very commonly used in organizations and to provide access to such devices, an authentication device is typically coupled to the multi-function devices. In environments, where security is deemed important or where the usage of the multi-function device needs to be tracked or monitored, it is important to authenticate the users before giving access to the multi-function device or its services. If the authentication device is not attached to the multi-function device, then it becomes an issue for such environments. In light of this, the disclosures provides methods and systems for managing authentication devices coupled to multi-function devices. In particular, the disclosure focuses on generating an alert or a notification and transmitting the alert to pre-authorized users, when the authentication device is disconnected or malfunctioned. The pre-authorized users then take any suitable action such as access the multi-function device remotely or otherwise fix the multi-function device. In this manner, the pre-authorized users need not be physically present in the vicinity of the multi-function device.

Exemplary Embodiments

Figure 1A:
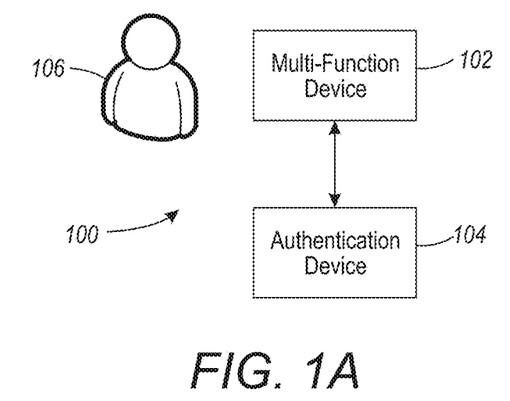
FIGS. 1A-1B illustrate exemplary environments in which various embodiments of the disclosure can be practiced.

FIG. 1A illustrates an exemplary environment 100 in which various embodiments of the disclosure can be implemented. The environment 100 includes a multi-function device 102, an authentication device 104 and a user 106. The disclosure may be used in highly secure environments where information security is deemed to be of highest priority.

As shown, the user 106 typically uses the multi-function device 102 for scanning, printing, copying, faxing, form filling, or a combination thereof. Before accessing the multi-function device 102, the user 106 is authenticated using the authentication device 104 as shown. The use of the authentication device 104 with the multi-function device 102 increases the security. For example, the multi-function device 102 only prints when the user 106 is at the multi-function device 102 to collect the print outs. Various examples of the authentication device 104 include, but not limited to, card readers, biometric readers such as retina readers, facial recognition, or fingerprint scanners, pin based keypads, or a combination of these. For each of the authentication device 104, the user 106 provides an authentication information using an input method. For example, if the authentication device 104 is a card reader, then the input method is a smart card for providing authentication information of the user 106 such as user name, password, access rights or the like. In another example, if the authentication device 104 is a pin based keypad, then the user 106 provides PIN as authentication information for accessing the multi-function device 102 or its services.

The authentication device 104 may be an external device that is detachably coupled to the multi-function device 102. In such cases, the authentication device 104 may be coupled to the multi-function device 102 via suitable ports such as Universal Serial Bus (USB). However, the authentication device 104 may be connected with any state of the art port of the multi-function device 102 that is capable of providing data communications and power supply. But, the authentication device 104 may be configured to use an external source of power. In other cases, the authentication device 104 may be an integrated part of the multi-function device 102.

In the context of the current disclosure, the multi-function device 102 is configured to monitor the authentication device 104 and then to detect state of functioning of the authentication device 104. The multi-function device 102 detects if the authentication device 104 gets disconnected/removed or malfunctioned. The event of disconnection or malfunctioning of the authentication device 104 is considered as a security breach event. Based on the detection, the multi-function device 102 generates an alert for one or more pre-authorized users, for example, admin users to take one or more pre-defined appropriate actions. The multi-function device 102 therefore cease all its operations. The multi-function device 102 may also be configured to generate audit logs or trails of such events for future references. Also, the multi-function device 102 may reinstate its services as soon as the authentication device 104 is re-installed properly and is in its working condition. The disconnection of the authentication device 104 may occur by accident or the authentication device 104 may come out from the multi-function device 102 unfortunately or maliciously. In some cases, the authentication device 104 may be malfunctioned as it may be broken, something maliciously happen, piece of power failed, cable disconnected or the like.

Figure 1B:
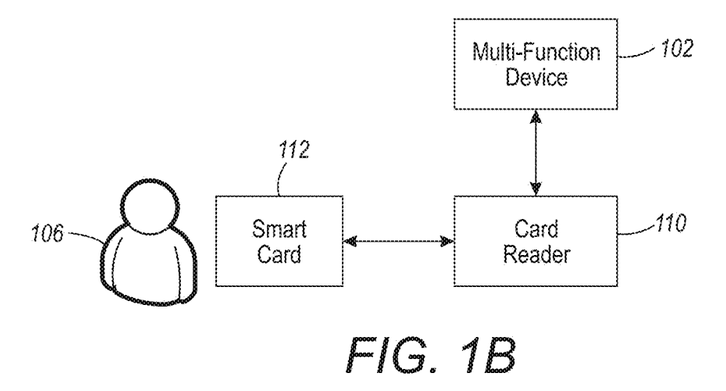

For better understanding, the authentication device 104 is considered as a card reader 110 as shown in FIG. 1B. Accordingly a smart card 112 is used by the user 106 for authenticating himself as a valid user of the multi-function device 102.

The smart card 112 includes a chip (although not shown) storing authentication credentials of the user 106 that may be read by the card reader 110 on card touch or on card swipe operation. The card reader 110 uses the data read from the smart card 112 to match it with pre-stored data of valid users. If the data matches, the card reader 110 allows the user 106 to access operations/services of the multi-function device 102. If the data does not match, then the card reader 110 ceases the operations of the multi-function device 102 from being accessed by the user 106.

The card reader 110 includes a slot for receiving the smart card 112. The card reader 110 may use any short range communication protocols for scanning the smart card 112. The smart card 112 may be a contactless card or may be a physical contact based card. For example, the card reader 110 may use NFC, RFID, Bluetooth, Infrared, magnetic strips, or other state of the art short range communication protocols. The card reader 110 though illustrated typically for smart card 112 authentication, can also be replaced by any state of the art authentication unit for providing similar functionalities. For example, biometric scanners may be used as alternative of the card reader 110. The biometric scanners may include fingerprint scan, retina scan, face recognition, hear-beat monitor, and like state of the art scanners. The card reader 110 may also be replaced by any pin-based authentication machine, where the user 106 can input his pre-registered pin-code for getting access to the services of the multi-function device 102.

Figure 2:
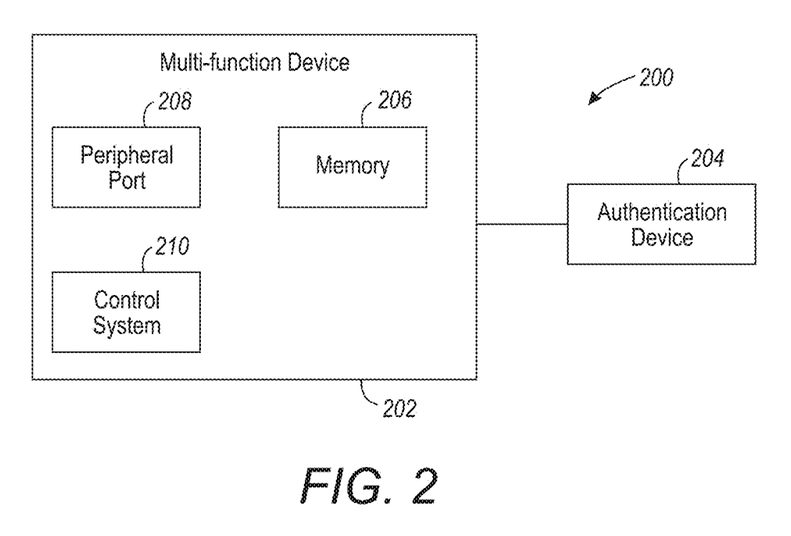
FIG. 2 illustrates an overall system for managing an authentication device.

FIG. 2 shows an overall system 200 for managing authentication devices, according to an embodiment of the disclosure. FIG. 2 is shown to include a multi-function device 202 having a memory 206, a peripheral port 208, and a control system 210. An authentication device 204 is coupled to the multi-function device 202. The authentication device 204 may be an integral part of the multi-function device 202, while the authentication device 204 may be an external unit connected to the multi-function device 202. For simplicity, the authentication device 204 is considered as a card reader 204, however, it is understood that the disclosure is applicable for all types of authentication devices as discussed above or developed later. Further, it is understood that the authentication device 204 is generally available and programmable to operate as described herein.

The card reader 204 is a device that includes a slot to receive a smart card (not shown) and then reads data stored in the smart card. The data stored in the smart card includes user credentials for authentication purposes. The user credentials are read by the card reader 204 for determining authentication of owner of the smart card. The smart card includes a card body and integrated circuit carried by the card body and has a memory storage capability. Although not limited thereto, the smart card is typically a credit card shaped card and stores authentication information such as a username, password user id, or a combination thereof in its memory. The integrated circuit may manage data storage in its memory and/or data transfer with another device such as the card reader 204. The memory of the smart card can be of any suitable type that can be embedded in or on a smart card, and can be writable and/or readable electronically, magnetically, or optically. For a person, it is understood that the card reader 204 and smart card are well known in the art and thus, any structural or functional details are not needed for the purpose of the current disclosure.

The peripheral port 208 is configured for receiving the card reader 204. For example, the port 208 may be USB port or may be a serial connection type port.

Further, the memory 206 stores information related to one or more users, (end users), one or more pre-authorized users. The information related to the end users may include authentication information, profile information, payment information or a combination of these. Other than this, the memory 206 stores alert setting instructions that indicate what kind of alert needs to be generated for the pre-authorized users. The settings may be defined by any of the pre-authorized users. In some cases, the alert setting instructions may be pre-configured with the multi-function device 202. Further the memory 206 stores the information related to the users, pre-authorized users, and alert setting instructions in any desired format. The alert setting instructions may be stored in a file such as a text file or XML file. Other formats may also be implemented for the current disclosure. Further, the memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes.

Referring back to the card reader 204, the card reader 204 receives the smart card from the user and reads the information stored on the smart card. The card reader 204 uses the information and transfers the information to the control system 210. For example, the card reader 204 is coupled to the multi-function device 202 via a USB peripheral port 208 of the device. In another example, the card reader 204 may be coupled to the multi-function device 202 via some other ways.

The control system 210 compares the information retrieved from the smart card and authenticates the user. Based on the comparison/match, the control system 210 allows the user to use one or more functions of the multi-function device 202. The functions may be scanning, copying, printing or the like. If the retrieved information is matched with the information pre-stored in the memory 206, the user is allowed to access the multi-function device 202 or its services/functions. Else, the control system 210 does not allow the user to use the multi-function device 202. The control system 210 monitors if the card reader 204 gets disconnected from the multi-function device 202 or is malfunctioned. The disconnection includes removal of the card reader 204 from the multi-function device 202, whereas malfunctioning of the multi-function device 202 tampering of the card reader 204, or non-working state due to hardware failures, power failures, cable connection or the like. Based on the detection, the control system 210 generates a notification or alert for one or more pre-authorized users. The control system 210 then transmits the alert notification to the one or more pre-authorized users. Various examples of the alert notification may include an email alert, a text message alert, an audit log entry, etc. For a person skilled in the art, it is understood that the alert notification mentioned herein are exemplary in nature, and the disclosure may be implemented for other types of alert notification as known in the art or developed later. The alert helps the admin users know any tampering, removal, malfunctioning, hardware failures, security issues, any other discrepancies or malicious activities corresponding to the usage of the card reader 204 and the multi-function device 202. The pre-authorized users may therefore be in a better position to take immediate action and resolve the security matter in time. The control system 210 keeps a log of all activities as performed by the user.

The control system 210 creates an audit log when the card reader 204 is disconnected from the multi-function device 202 or is malfunctioned. In some cases, the control system 210 ceases the operation of the device 202 when the card reader 204 is found disconnected from the multi-function device 202. Further, the operations of the multi-function device 202 may then be restored after receiving an instruction from the one or more pre-authorized users (over the network). In some embodiments, the operation of the multi-function device 202 may be restored after a certain period of time after reinstating the card reader 204.

In some embodiments, the multi-function device 202 may be connected to one or more other similar multi-function devices over a corporate network. In such cases, an alert setting instruction of the device 202 may be replicated/cloned to the other multi-function devices of the network.

Figure 3A:
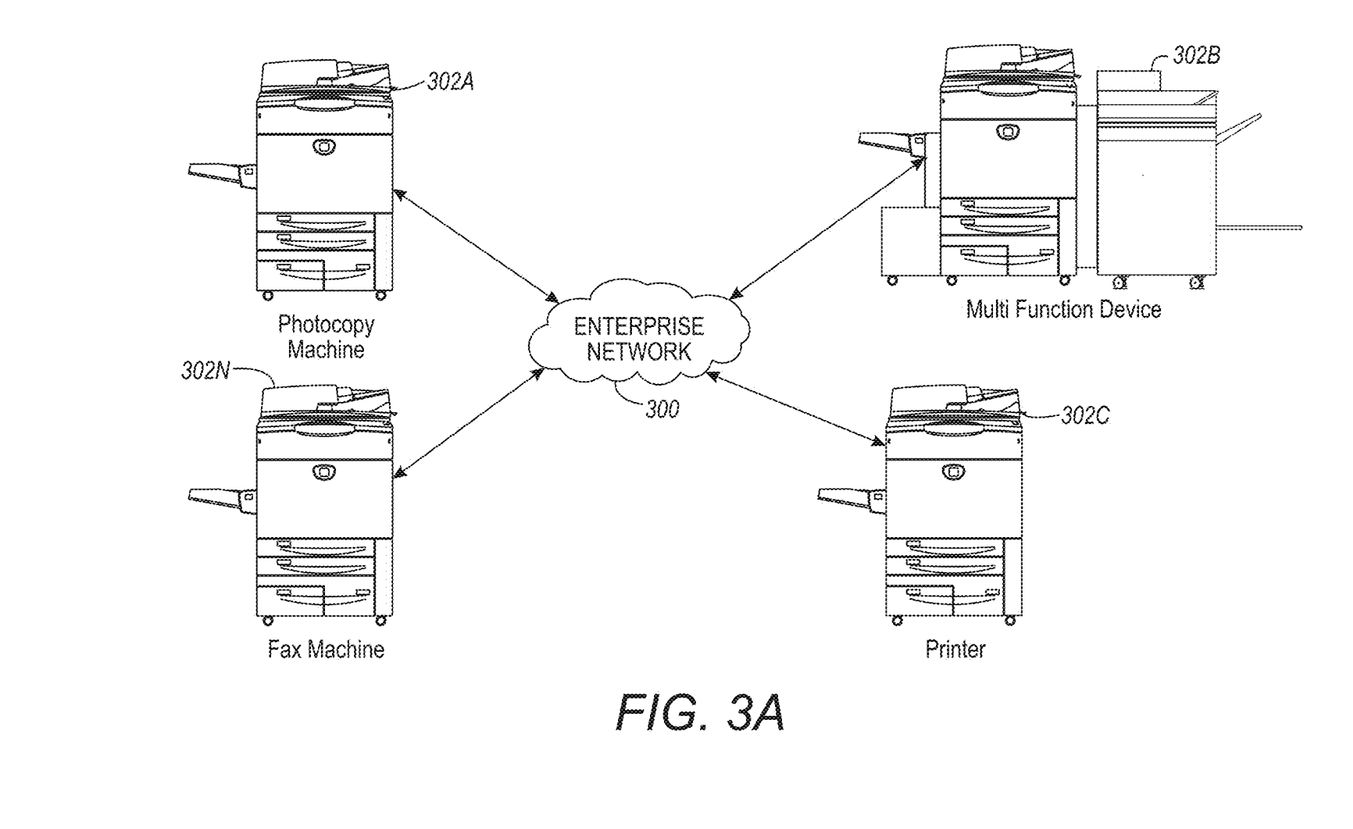
FIGS. 3A-3B show one or more multi-function devices connected over a network.

One such example is shown in FIG. 3A, where a photocopy machine 302a, a multi-function device 302b, a printer 302c, and a fax machine 302n are connected over a network 300 such as an enterprise network. In the shown embodiment, the photocopy machine 302a clones or transfers its alert setting instructions on other machines such as MFD 302b, printer 302c, and fax machine 302n (N being any arbitrary number). Each device 302a, 302b, 302c, and 302n in the network 300 may be configured for storing customized alert setting instructions. However, the admin users (using admin devices) may simply prepare alert setting instructions on one device such as MFD 302b and then may instruct the MFD 302b to clone the settings on to all other devices on the network 300. This may facilitate the admin devices to authenticate once on the MFD 302b for cloning the settings on all the devices 302a, 302c, and 302n, despite of manually configuring all devices 302a, 302c, and 302n in the network 300 by re-authenticating himself over all authentication devices associated to these devices 302a, 302c, and 302n.

Figure 3B:
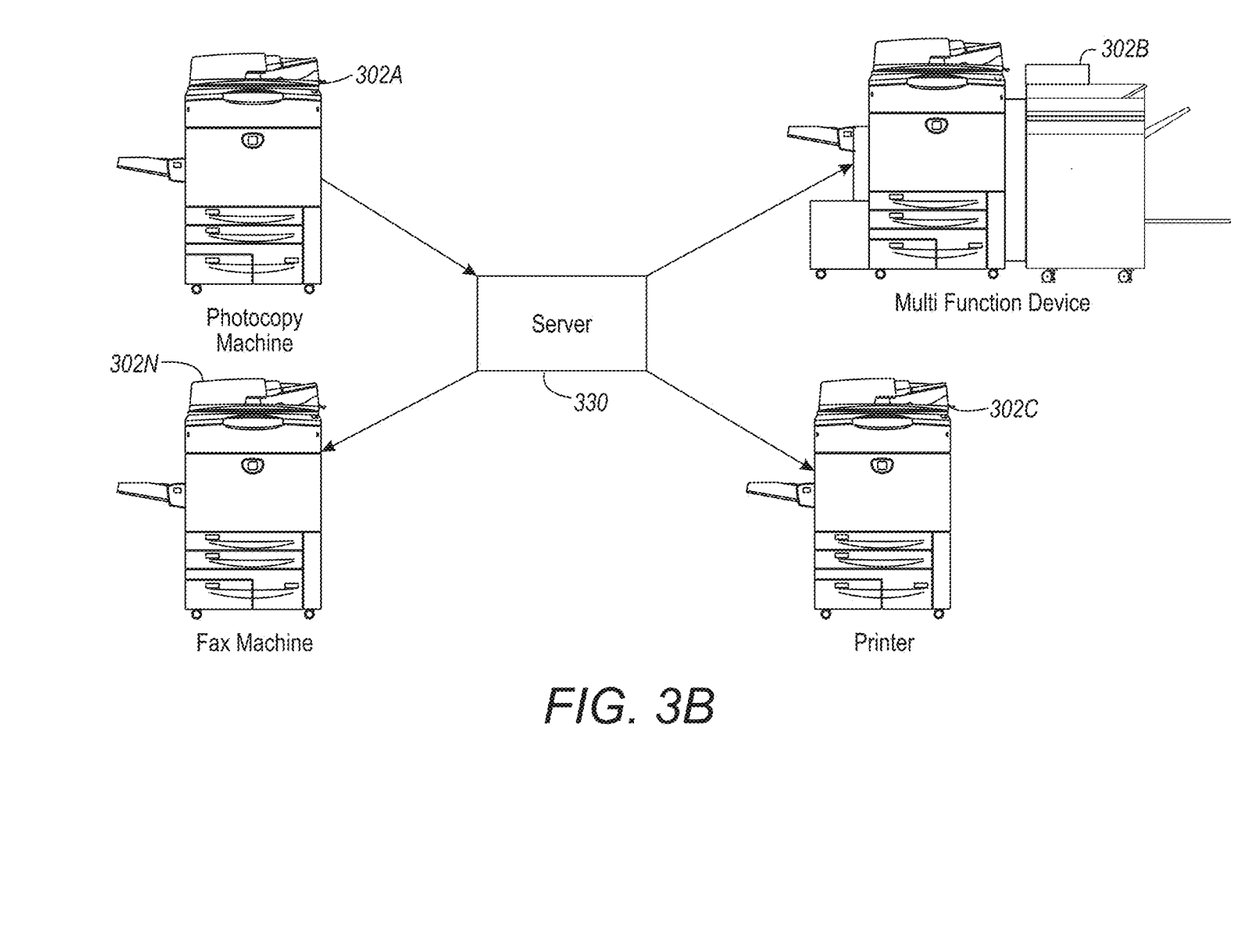

In one implementation where the devices 302a, 302b, 302c, and 302n are connected over the network 300, the devices 302a, 302b, 302c, and 302n are controlled by a server 330 as shown in FIG. 3B. The server 330 controls all the functionalities related to the devices 302a, 302b, 302c, and 302n such as printing, scanning, copying or the like. In the context of the current disclosure, the server 330 is configured to monitor whether the authentication device such as a card reader gets disconnected from any of the corresponding devices 302a, 302b, 302c and 302n. Based on the detection, the server 330 generates a notification or alert for the one or more pre-authorized users. The server 330 then transmits the alert notification to the one or more pre-authorized users. Various examples of the alert notification may include an email alert, a text message alert, an audit log entry, etc.

Figure 4A:
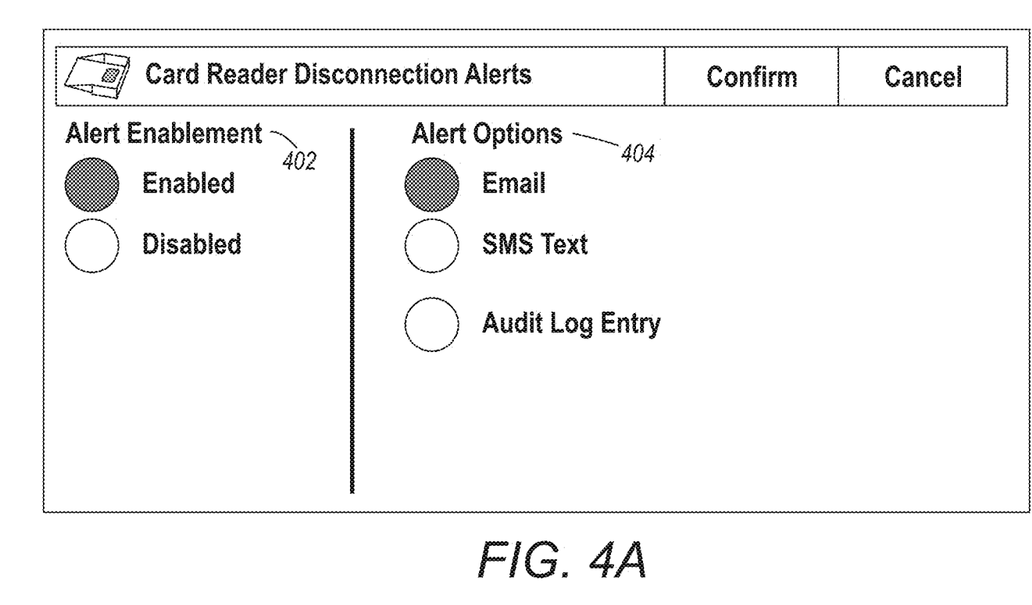
FIGS. 4A and 4B show exemplary snapshots related to card reader disconnection alerts.
Figure 4B:
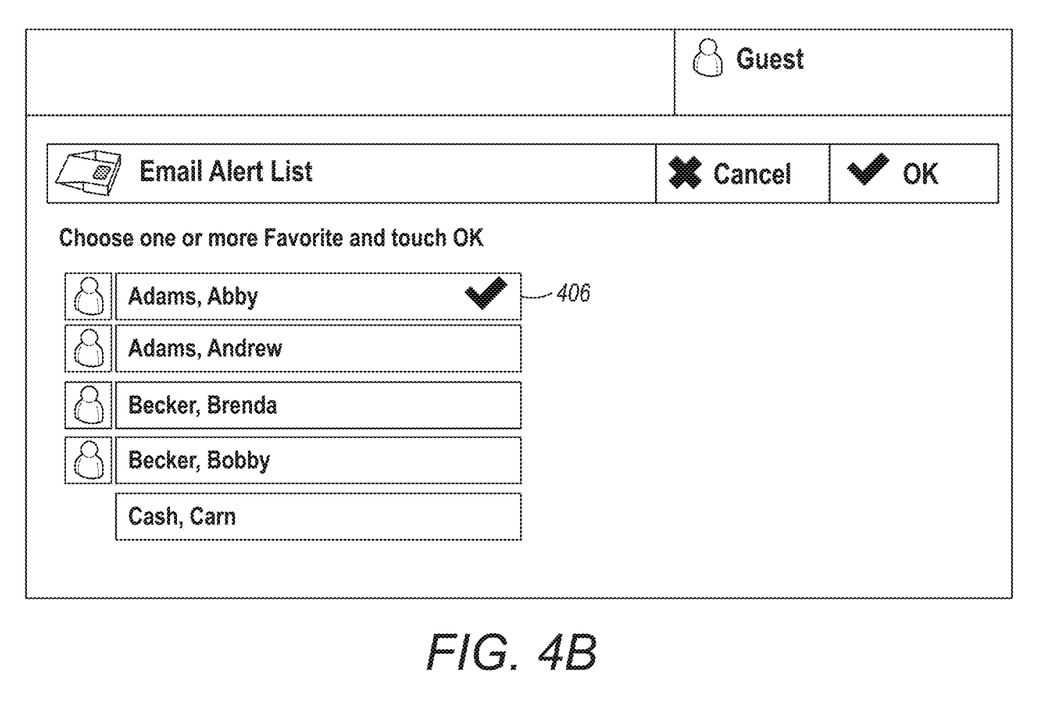

FIGS. 4A and 4B show a screen shot indicating a user interface enabling an admin user for card reader disconnection setting or alerts. As shown in FIG. 4A, the admin user can enable the option of alert, indicated by 402. The admin user can further select alert options marked by 404 using check box as shown. Here, the admin user selects email (marked as 404) alert option. On the similar lines, the admin user can configure emails who he or she wishes to send alert to. The email alert list is shown in FIG. 4B and the selected email is indicated by 406.

Figure 5:
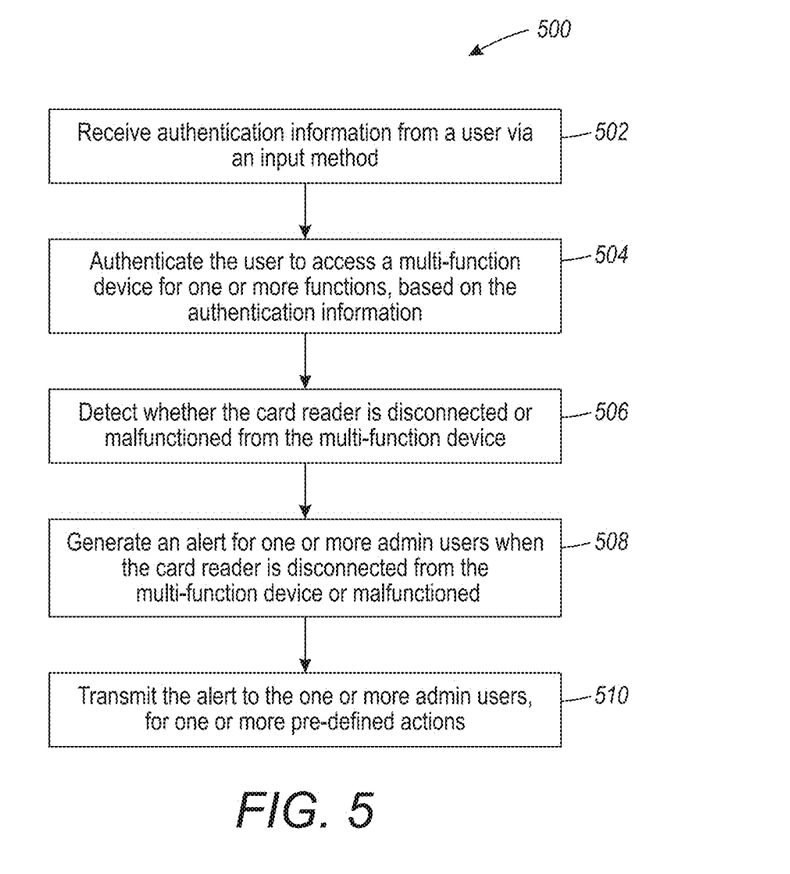
FIG. 5 is a method flowchart for managing an authentication device coupled to a multi-function device.

FIG. 5 is a method flowchart 500 for managing an authentication device such as a card reader coupled to a multi-function device. The method is explained considering that alert setting option is enabled by an admin user. Along with this, the admin user sets preferred mode/type of alert to be generated. For example, the preferred mode of alert may be email, message, or a combination of these. In this manner, the alert setting instructions is received from an admin user. Further, it is considered that the card reader device is coupled to the multi-function device.

Initially, information related to one or more users, one or more pre-authorized users or alert setting instructions is stored. At 502, an authentication information is received from a user via an input method as discussed above. One example of the input method may be a smart card for authentication purpose. The smart card may be scanned by the card reader to validate authenticity of the smart card owner. The smart card includes information specific to a user. For example, the information may be profile information, authentication information such ID, payment information, or a combination of these. The details stored in the smart card are read and retrieved by the multi-function device. The authentication information is then compared with pre-stored information in the multi-function device. Based on the authentication information, the user is authenticated or authorized to access the multi-function device for one or more functions, at 504. The functions may be printing, scanning, copying or the like.

At 506, it is detected whether the card reader is disconnected from the multi-function device or is malfunctioned. The detection of the disconnection or malfunctioning is performed by a control system, which then communicates the status/state/fault to the multi-function device.

Based on the check, at 508, an alert is generated for the admin users when the card reader is disconnected from the multi-function device or malfunctioned. At 510, the alert is transmitted to the admin users for one or more pre-defined actions. The alert is sent with a pre-defined/pre-formatted message indicating that the card reader device is not working or operational. The pre-defined message may include type of authentication device, details of the user accessing the multi-function device or any additional relevant details. Then, an audit log entry is created when the authentication device is disconnected from the multi-function device or malfunctioned. Based on the notification, the admin user takes suitable action, such as sending a local technician, taking remote access of the multi-function device or the like.

The alert may be sent to other users who are authorized to receive the alert and this can be configured at the time of configuring alert setting instruction. The alert setting may be updated later anytime as preferred by the admin user.

Figure 6:
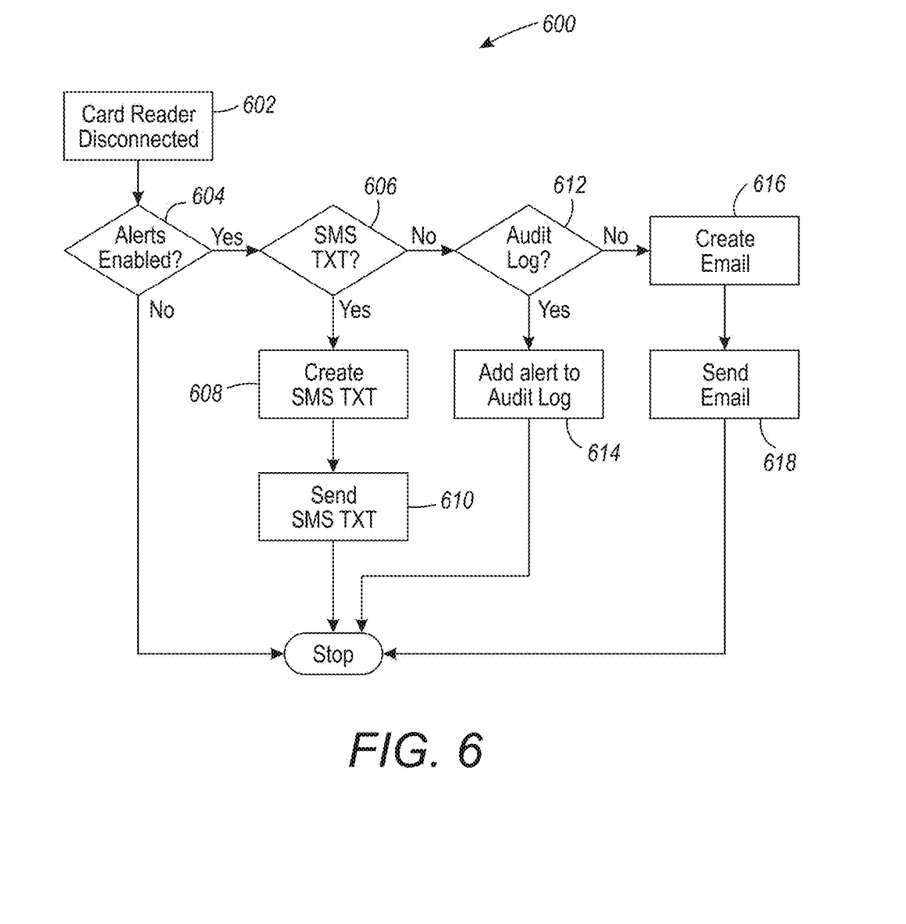
FIG. 6 is a method flowchart for generating alerts related to an authentication device.

FIG. 6 illustrates a flow diagram 600 for generating notifications related to a card reader, according to an embodiment of the disclosure.

At 602, it is checked whether the card reader device is disconnected or tampered. Thereafter, at 604, it is checked whether an alert setting option is enabled. If alert setting option is disabled, then the method is completed. However, if the alert facility is enabled, then at 606, it is checked if the alert mode is selected as SMS. If the SMS mode is selected, then the method proceeds to 608, where a pre-formatted SMS text is created based on the disconnection event and the pre-formatted text SMS is transmitted to a pre-authorized user over a network, at 610.

However, if SMS mode is found to be disabled, then at 612 it is checked, whether audit log mode is selected. If audit log mode is selected, then the method proceeds to 614, where audit log is created to add an alert. Otherwise, at 616, an email of a pre-defined format is created and the email is sent to the pre-authorized user at 618. In this manner, the pre-authorized user is informed about the disconnection or malfunctioning of the card reader to take any appropriate action.

For a person skilled in the art it is understood that operational and structural details related to various system elements such as multi-function devices, authentication devices, ports, etc., are known and thus can be referred to and those details do not limit the scope of the disclosure. With regard to the current disclosure, the alerts related to authentication devices are generated as discussed above in detail.

The disclosure provides methods and systems for managing authentication devices such as card readers coupled to multi-function devices. The disclosure enables expedited handling of any issues related to hardware failures or malicious activity for remotely managed multi-function devices. The disclosure further helps decreases the time to resolve and ensures the multi-function device is always running. If something malicious is detected, the disclosure helps prevent the same.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

The order in which the method is described is not intended to be construed as a limitation and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device configured for managing an authentication device coupled to the multi-function device, comprising:
   a memory for storing information related to one or more users, one or more pre-authorized users and alert setting instructions;
   the authentication device coupled to a universal serial bus (USB) peripheral port of the multi-function device, the authentication device configured for:
      receiving authentication information from a user via an input method; and
   a control system configured for:
      authenticating the user to access the multi-function device for one or more functions, based on the authentication information of the user;
      checking whether the authentication device is disconnected from the multi-function device or is malfunctioned;
      generating an alert for the one or more pre-authorized users when the authentication device is disconnected from the multi-function device or malfunctioned;
      transmitting the alert with pre-formatted message to the one or more pre-authorized users, for one or more pre-defined actions, wherein the alert is transmitted to resolve a security matter; and
      ceasing the operation of the multi-function device when the authentication device is disconnected from the multi-function device or malfunctioned.

2. The multi-function device of claim 1, wherein the authentication device is detachably coupled to the USB port of the multi-function device.

3. The multi-function device of claim 1, wherein the authentication device is integral to the multi-function device.

4. The multi-function device of claim 1, wherein the alert comprises at least one of an email alert, a text message alert and an entry in an audit log, and wherein the pre-formatted message comprises working status of the authentication device, type of the authentication device, and details of the user accessing the multi-function device.

5. The multi-function device of claim 1, wherein the control system is configured for creating an audit log when the authentication device is disconnected from the multi-function device or malfunctioned.

6. The multi-function device of claim 1, wherein the multi-function device is connected to one or more multi-function devices over a network.

7. The multi-function device of claim 6, wherein the control system is configured for cloning the alert setting instructions to the one or more multi-function devices connected over the network.

8. The multi-function device of claim 1, wherein the authentication device comprises one of a card reader, a biometric device, a keypad, and a proximity reader.

9. The multi-function device of claim 1, wherein the input method comprises one of a smart card, a fingerprint, retina, and a PIN.

10. The multi-function device of claim 1, wherein the security matter comprises detecting disconnection or malfunction of the authentication device.

11. The multi-function device of claim 10, wherein disconnection comprises removal of the authentication device from the multi-function device.

12. The multi-function device of claim 10, wherein malfunction comprises at least one of tampering of the authentication device, non-working state due to hardware failure, power failures, and cable connection.

13. A multi-function device for generating alerts related to card readers, comprising:
   a memory for storing information related to one or more users, one or more pre-authorized users and alert setting instructions;
   a card reader comprising:
      a slot for receiving a smart card containing authentication information specific to a user; and
      a control system configured for:
         detecting the smart card as input by the user within the slot;

authenticating the user to access the multi-function device for one or more functions, based on the authentication information stored in the smart card;

generating an alert with a pre-formatted message, for the one or more pre-authorized users, when the card reader is disconnected or malfunctioned;

sending the alert with the pre-formatted message to the one or more pre-authorized users, for one or more pre-defined actions, wherein the alert is sent to resolve a security matter; and ceasing the operation of the multi-function device when the card reader is disconnected from the multi-function device or malfunctioned.

14. The multi-function device of claim 13, wherein the smart card comprises one of a contactless card and a physical contact card.

15. The multi-function device of claim 13, wherein the control system is configured for monitoring the card reader for disconnection or for malfunctioning.

16. The multi-function device of claim 13, wherein the security matter comprises detecting disconnection or malfunction of the authentication device.

17. The multi-function device of claim 16, wherein disconnection comprises removal of the authentication device from the multi-function device.

18. The multi-function device of claim 16, wherein malfunction comprises at least one of tampering of the card reader, non-working state due to hardware failure, power failures, and cable connection.

19. A method for generating an alert related to an authentication device coupled to a multi-function device, comprising:

storing information related to one or more users, one or more admin users and alert setting information;

receiving authentication information from a user via an input method;

authenticating the user to access the multi-function device, based on the authentication information;

detecting whether the authentication device is disconnected from the multi-function device or malfunctioned;

generating an alert for the one or more admin users when the authentication device is disconnected from the multi-function device or malfunctioned;

transmitting the alert with pre-formatted message to the one or more admin users, for one or more pre-defined actions, wherein the alert is transmitted to resolve a security matter; and ceasing the operation of the multi-function device when the authentication device is disconnected from the multi-function device or malfunctioned.

20. The method of claim 19, wherein the authentication device is one of a card reader, a biometric device, and a keypad.

21. The method of claim 19, wherein the alert comprises at least one of an email alert, a text message alert and an audit log entry, and wherein the pre-formatted message comprises working status of the authentication device, type of the authentication device, and details of the user accessing the multi-function device.

22. The method of claim 19, wherein the input method comprises one of a smart card, a fingerprint, retina and a PIN.

23. The method of claim 19, further comprising creating an audit log when the authentication device is disconnected or malfunctioned.

24. The method of claim 19, further comprising tracking usage of the multi-function device when the user is authenticated.

25. The method of claim 19, further comprising receiving an alert setting instruction from an admin user.

26. The method of claim 19, wherein the security matter comprises detecting disconnection or malfunction of the authentication device.

27. The method of claim 26, wherein disconnection comprises removal of the authentication device from the multi-function device.

28. The method of claim 26, wherein malfunction comprises at least one of tampering of the authentication device, non-working state due to hardware failure, power failures, and cable connection.

* * * * *